UNITED STATES PATENT OFFICE.

SAMUEL KNOPF, OF VIENNA, AUSTRIA-HUNGARY.

PROCESS OF TRANSFORMING SUBSTANCES SOLUBLE IN ALCOHOL INTO EMULSIONS IN WATER.

978,307. Specification of Letters Patent. Patented Dec. 13, 1910.

No Drawing. Application filed October 23, 1908. Serial No. 459,276.

*To all whom it may concern:*

Be it known that I, SAMUEL KNOPF, a subject of the Emperor of Austria-Hungary, residing at Vienna, in the Empire of Austria-Hungary, have invented certain new and useful Improvements in Processes of Transforming Substances Soluble in Alcohol into Emulsions in Water, of which the following is a specification.

The present invention relates to the transformation of certain solid or liquid substances insoluble in water into clear emulsions, which can be mixed with water of any quantity. The transformation is effected by means of oleic acid which is saponified in the presence of alcohol without the application of heat with a quantity of alkali being insufficient for complete neutralization, and which is then mixed with the substances to be emulsified with or without the addition of mineral oils or petroleum. Thus emulsions are formed, that can be mixed with water in any quantity. In this manner oils, like turpentine, hydrocarbons, as for instance benzin, also tetrachlorid of carbon and quite a number of solid and liquid substances insoluble in water like salol, thymol, naphthol, menthol, naphthalene, can be transformed into emulsions, capable of being diluted in large quantities of water without precipitation of the components insoluble in water.

As examples the following may be stated: First 40 parts of oleic acid are mixed intimately with 20 parts of alcohol and 8 parts of potash lye of 1:1 at ordinary temperature. As soon as the mixture has cleared, which occurs almost immediately after saponification, to 100 parts of the mixture 200–600 parts of turpentine are added. The mixture being ready and clear, holding the turpentine, even when allowed to stand for a long time, is capable of being mixed with water in any desirable proportions and can therefore be used for instance as an addition in soap-manufacture, since it can be stirred into a mass of soap, still being liquid without any difficulty. By means of this soluble turpentine emulsion soap can be made, containing 10% and more of turpentine, which has been impossible heretofore.

Second, 40 parts of oleic acid are saponified with 20 parts of alcohol and 8 parts of caustic potash lye (1:1) at ordinary temperature. To this mixture, a solution of naphthalene 20% to 50% in mineral oil or petroleum 80% to 50% is added, thus forming a liquid which, when mixed with 1–500 parts of water, contains the naphthalene solution in extremely finely divided state without any separation of this substance in itself insoluble in water, no matter how much water may be added. Such emulsions are useful for preserving plants and for the protection of objects of all kinds against moths, etc., because in liquid form they can be applied easily and because the cost is very low.

Having now described my invention, what I claim is:

The process for transforming substances insoluble in water into emulsion, which consists in saponifying at ordinary temperature oleic acid, substantially 40 parts, with 8 parts of 50% caustic alkali solution in the presence of 20 parts of alcohol, then intimately mixing the same with naphthalene dissolved in petroleum forming an emulsion which can be mixed with water in any quantity.

In testimony whereof I hereunto affix my signature in presence of two witnesses.

SAMUEL KNOPF.

Witnesses:
 ISIDOR FISCHER,
 ROBERT W. HEINGARTNER.